Feb. 26, 1963    K. A. ROBINSON    3,079,548
ELECTROMECHANICAL SIGNALLING APPARATUS
Filed Nov. 3, 1959    2 Sheets-Sheet 1

Feb. 26, 1963    K. A. ROBINSON    3,079,548
ELECTROMECHANICAL SIGNALLING APPARATUS
Filed Nov. 3, 1959    2 Sheets-Sheet 2
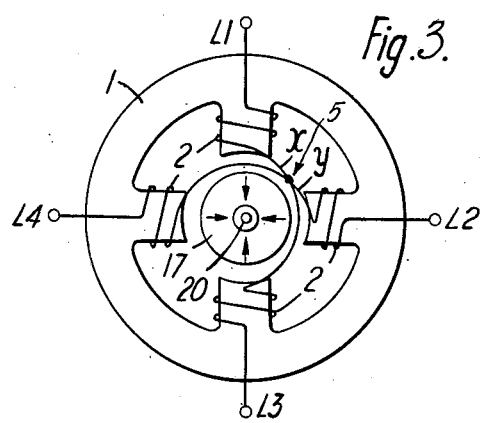
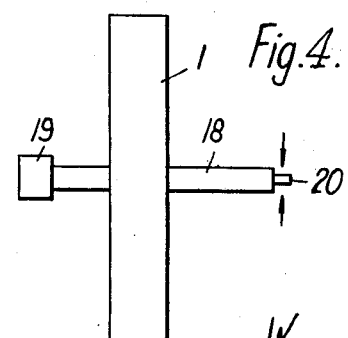

United States Patent Office 3,079,548
Patented Feb. 26, 1963

3,079,548
ELECTROMECHANICAL SIGNALLING
APPARATUS
Kenneth Arthur Robinson, Etchinghill, near Rugeley, England, assignor to Lancashire Dynamo Electronic Products Limited, Rugeley, England, a company of Great Britain
Filed Nov. 3, 1959, Ser. No. 850,591
Claims priority, application Great Britain Nov. 5, 1958
4 Claims. (Cl. 323—109)

This invention relates to electromechanical apparatus for transmitting electrical information, which has been designed primarily for transmitting information corresponding to the angular position of a rotor but can be adapted to transmit information corresponding to the angular and radial positions of a member free to move both angularly round an axis and radially towards or away from that axis.

In this specification, the word "inductor" is used, by analogy with the inductor of an inductor generator to mean a mass of magnetic material the movement of which serves to effect variations in the magnetic flux passing through a coil or coils. The object of the invention is to make use of such an inductor in conjunction with a polyphase exciting winding to produce signals which can manifest the angular direction or both the angular direction and the amplitude of a displacement.

According to the invention, the apparatus comprises a stationary magnetic part having a polyphase exciting winding so coupled to an output circuit under the control of an inductor as to produce an alternating-current output which depends upon the angular position of the inductor. The inductor is preferably arranged to control the output of the machine by varying the magnetic reluctance of the magnetic circuits of the phase windings in cyclic order as the inductor rotates.

The magnetic part may have a number of poles equal to the number of phases or an integral multiple thereof. For simplicity of description a four-pole, four-phase machine will be described in this specification.

Figure 1:
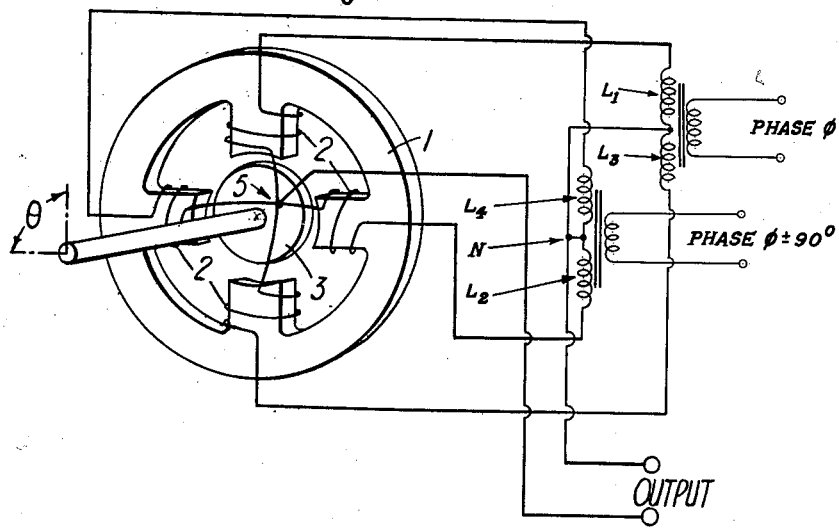
Figure 2:
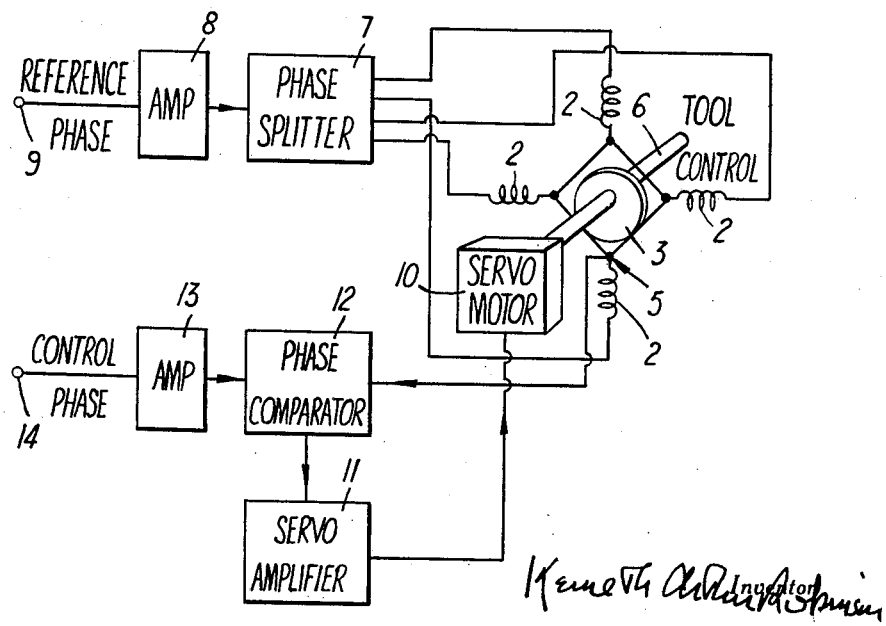

In the accompanying drawings:

FIGURE 1 is a somewhat diagrammatic representation of a control transmitter constructed in accordance with the invention, FIGURE 2 is a diagram illustrating the application of the control transmitter to a machine control system, FIGURES 3 and 4 are diagrammatic end and side views respectively of a modified machine adapted to transmit information corresponding to both angular and radial displacements.

The machine shown in FIGURE 1 has a four-pole stationary magnet or "stator" 1 carrying four equal stator exciting windings 2 which are uniformly spaced apart round the axis of the machine and thus have magnetic circuits angularly spaced round that axis. The machine also has an unwound rotor 3 constructed so that it is magnetically eccentric and thus acts as an eccentric inductor designed to vary the magnetic reluctance of the magnetic circuits of the windings 2 in cyclic order as the rotor rotates. To obtain the best performance and accuracy the machine should be designed so that the rotation of the rotor produces sinusoidal variations in the reactances of the windings 2.

The machine is star connected to the four line terminals L1, L2, L3 and L4 of a four-phase supply so that an alternating-current potential difference constituting the output of the machine appears between the common junction 5 of the star windings 2 and the star point N of the supply by reason of the magnetic eccentricity of the rotor. If the machine is designed and constructed so as to produce sinusoidal variations in the reactances of the winding as described above, the output signal will have a constant amplitude but its electrical phase angle relative to a selected phase of the supply will be directly proportional to the angular rotation of the rotor 3. The machine may thus be used for any purpose where a control shaft or knob is required to adjust the phase of a supply, or for thyratron or ignitron power control. As shown in FIG. 1, the two phase windings L, L3 are two halves of a split secondary winding of a transformer whose primary winding receives a voltage of phase $\phi$, whereas the two phase windings L2, L4 are the two halves of a split secondary winding of another transformer whose primary winding receives a voltage of phase $\phi \pm 90°$.

The machine may also be used as a monitoring element for feeding back a signal determined by the movement of a controlled element of the machine to a phase comparator. This is illustrated in FIGURE 2 of the drawings in which the reference numeral 6 indicates a drive shaft for a tool feeding or traversing mechanism. The drive shaft 6 is mechanically coupled to the rotor 3 of a control transmitter constructed as shown in FIGURE 1 and having its four exciting windings 2 supplied with a symmetrical four-phase current by a phase-splitter 7 to which a single-phase alternating current is supplied through an amplifier 8 from a reference source 9. The output circuit of the phase splitter 7 is a four-phase circuit star connected like the circuit L1, L2, L3 and L4 shown in FIGURE 1 and has a neutral point N through which the circuit from the point 5 through the phase comparator 12 is completed. The drive shaft is operated by a servo motor 10 driven by a servo amplifier 11 under the control of a phase comparator 12 which receives one of its phase inputs from the common junction 5 of the windings 2 and receives its other phase input through an amplifier 13 from a control source 14. The control source 14 generates a signal equal in frequency to the reference signal but with a varying degree of phase shift dependent on the rotation of the drive shaft 6 required.

In the operation of the control system shown in FIGURE 2, the output signal appearing at the common junction 5 of the control transmitter has a phase angle which varies in direct proportion to the angular rotation of the rotor 3 as has been described with reference to FIGURE 1. The phase comparator 12 therefore produces an output signal which depends upon the difference between the actual angular position of the drive shaft 6 and the position set for it by the phase of the current at the control source 14. The servo amplifier 11 drives the servo motor 10 in the appropriate direction to reduce this difference, the gain of the amplifier 11 being such that the resultant difference between the actual angular position of the shaft 6 and the position set for it by the phase of the current at 14 tends to zero. By continuously advancing or retarding the phase of the control signal at 14 relatively to the reference phase at 9, the shaft 6 can be rotated through any required number of revolutions.

Although no stator has been shown in FIGURES 2 and 3 of the drawings it will be understood of course that the exciting windings 2 shown in each of these figures, are actually wound upon a stator corresponding to the stator 1 shown in FIGURE 1.

FIGURES 3 and 4 of the drawings illustrate a modification adapted to transmit information corresponding to both angular and radial displacements. In this modification there is a stator 1 having windings 2 as previously described, but the eccentric rotor 3 is replaced by an inductor in the form of a ferro-magnetic mass 17 attached to a rod 18 which is resiliently anchored to a fixed support 19 at one end and provided with a head 20 at its other end by which the rod 18 can be deflected so as to displace the inductor 17 in any direction transverse to the axis of the stator. The windings 2 of the machine shown in FIGURES 3 and 4 are star connected to the four line terminals of a four-phase supply having a star point N in exactly the same way as those shown in FIGURE 1.

The electrical output obtained from the device shown in FIGURES 3 and 4 depends upon both the angular direction in which the inductor 17 is displaced by the deflection of the rod 18 and the amount by which it is so displaced. The junctions $x$ and $y$ of opposite pairs of stator windings in the construction shown in FIGURE 4 are joined together to form a common junction like the junction 5 of FIGURES 1 and 2. The output which thus appears between the common junction 5 and the star point N has a phase displacement determined by the angular direction of the physical displacement of the inductor and an amplitude determined by the amount of the physical displacement.

The control transmitter shown in FIGURES 3 and 4 is particularly useful as a sensing device for controlling the operation of a copying machine by engagement of the head 20 with the surface of a model or template. The deflection of the rod 18 by engagement of the head 20 with the surface of a model or template causes the transmitter to produce signals which can be used to control the movement of a traversing mechanism to which the transmitter is attached so as to cause it to follow the outline of the model or template.

I claim:

1. An electromechanical device for transmitting electrical information comprising a magnet having a polyphase exciting winding composed of a plurality of phase windings having magnetic circuits angularly spaced round an axis, an inductor in the form of a magnetically eccentric rotor mounted to rotate on said axis for varying the reluctance of said magnetic circuits in cyclic order as the rotor rotates, and two output connections for transmitting electrical outputs from said winding proportional to rectangular components of the angular displacement of said rotor, said windings including phase windings in quadrature having separate junctions connected to said output connections.

2. An electromechanical device for transmitting electrical information, comprising a magnet having a polyphase exciting winding composed of a plurality of phase windings having a common junction and having magnetic circuits angularly spaced round an axis, an output connection electrically continuous with said common junction, and an inductor moveable both radially and angularly with respect to said axis for generating an electrical output from said winding having an amplitude determined by said radial movement and a phase determined by said angular movement.

3. An electromechanical device for transmitting electrical information, comprising a magnet having a polyphase exciting winding composed of a plurality of phase windings having magnetic circuits spaced round said axis, an inductor moveable both radially and angularly with respect to said axis for generating a total electrical output from said winding dependent upon both the radial and angular displacements of the inductor, the said winding having two output connections and including phase windings in quadrature having separate junctions connected to said output terminals to transmit outputs having amplitures proportional to rectangular components of the displacement of said inductor.

4. An electromechanical device for transmitting electrical information, comprising a magnet having a polyphase exciting winding composed of a plurality of star connected phase windings having magnetic circuits angularly spaced round an axis and having a common junction, an inductor angularly displaceable round said axis for varying the magnetic reluctance of said magnetic circuits in cyclic order, a polyphase supply for said exciting winding having a star point and a pair of output terminals connected respectively to said common junction and star point.

References Cited in the file of this patent

UNITED STATES PATENTS

| 2,462,095 | Halpert et al. | Feb. 22, 1940 |
| 2,403,958 | Seeley | July 16, 1946 |
| 2,475,132 | Ergen | July 5, 1949 |
| 2,483,090 | Fuller | Sept. 27, 1949 |
| 2,492,731 | Branson | Dec. 27, 1949 |
| 2,864,066 | Egbert et al. | Dec. 9, 1958 |
| 2,880,391 | Norton | Mar. 31, 1959 |
| 2,941,140 | Rudolf et al. | June 14, 1960 |